(12) United States Patent
Schroeder et al.

(10) Patent No.: US 11,340,139 B2
(45) Date of Patent: May 24, 2022

(54) METHOD AND APPARATUS FOR WEAR ANALYSIS ON A MACHINE TOOL

(71) Applicant: CHIRON-WERKE GmbH & Co. KG, Tuttlingen (DE)

(72) Inventors: Pascal Schroeder, Muehlheim an der Donau (DE); Claus Eppler, Messstetten (DE)

(73) Assignee: CHIRON-WERKE GmbH & Co. KG, Tuttlingen (DE)

( * ) Notice: Subject to any disclaimer, the term of this patent is extended or adjusted under 35 U.S.C. 154(b) by 483 days.

(21) Appl. No.: 16/539,256

(22) Filed: Aug. 13, 2019

(65) Prior Publication Data

US 2020/0088604 A1    Mar. 19, 2020

(30) Foreign Application Priority Data

Sep. 17, 2018   (DE) .................. 10 2018 122 759.0

(51) Int. Cl.
*G01M 13/00*     (2019.01)
*G05B 19/4065*   (2006.01)
(Continued)

(52) U.S. Cl.
CPC ......... *G01M 13/00* (2013.01); *B23Q 17/0952* (2013.01); *G05B 19/401* (2013.01);
(Continued)

(58) Field of Classification Search
CPC . G01M 13/00; B23Q 17/0952; G05B 19/401; G05B 19/404; G05B 19/4065; G05B 2219/37256
See application file for complete search history.

(56) References Cited

U.S. PATENT DOCUMENTS

| | | | | |
|---|---|---|---|---|
| 5,412,300 A | * | 5/1995 | Meyer ................. | G05B 19/41 901/14 |
| 6,188,194 B1 | * | 2/2001 | Watanabe ............ | G05B 19/406 318/563 |

(Continued)

FOREIGN PATENT DOCUMENTS

| DE | 102005058038 B3 | 7/2007 |
|---|---|---|
| DE | 102009025167 B3 | 9/2010 |

(Continued)

OTHER PUBLICATIONS

Knapp, Von Wolfgang "Kreisformtest in der praktischen Anwendung auf NC-Werkzeugmaschinen" XP000037180; Technische Rundschau 46/88; Nov. 11, 1988.

(Continued)

*Primary Examiner* — Ronald D Hartman, Jr.

(74) *Attorney, Agent, or Firm* — Jason H. Vick; Sheridan Ross, PC

(57) ABSTRACT

A method of controlling a machine tool comprising the steps of: providing a data memory containing, for at least one specific working axis of the plurality of working axes, a plurality of data tuples each assigning a load value to a position value relative to the specific working axis, selecting a first data tuple and a second data tuple whose load values are different, and generating at least one control command for the machine tool, wherein the control command is adapted to perform a first tolerance measurement at a first position value and a second tolerance measurement at a second position value, and wherein, based on a first result of the first tolerance measurement and a second result of the second tolerance measurement, information about wear of a part of the machine tool is output. A corresponding device is also be disclosed.

20 Claims, 2 Drawing Sheets

(51) Int. Cl.
  *G05B 19/401* (2006.01)
  *G05B 19/404* (2006.01)
  *B23Q 17/09* (2006.01)

(52) U.S. Cl.
  CPC ....... *G05B 19/404* (2013.01); *G05B 19/4065* (2013.01); *G05B 2219/37256* (2013.01)

(56) References Cited

U.S. PATENT DOCUMENTS

| | | | | |
|---|---|---|---|---|
| 6,681,145 | B1* | 1/2004 | Greenwood | B25J 9/1692 |
| | | | | 700/193 |
| 8,432,119 | B2* | 4/2013 | Barkman | B23Q 17/20 |
| | | | | 318/560 |
| 8,610,393 | B2* | 12/2013 | Barkman | G05B 19/401 |
| | | | | 318/575 |
| 9,864,362 | B2 | 1/2018 | Wunderlich et al. | |
| 10,585,419 | B1* | 3/2020 | Benedict | G05B 19/4097 |
| 2002/0189120 | A1* | 12/2002 | Kaneda | G05B 19/042 |
| | | | | 33/636 |
| 2007/0198123 | A1* | 8/2007 | Hoffman | G05B 19/4065 |
| | | | | 700/177 |
| 2009/0222306 | A1 | 9/2009 | Bretschneider et al. | |
| 2015/0092185 | A1* | 4/2015 | Passini | G01P 3/38 |
| | | | | 356/28 |
| 2015/0261207 | A1 | 9/2015 | Wunderlich et al. | |
| 2016/0246282 | A1* | 8/2016 | Matsushita | G05B 19/404 |
| 2016/0327935 | A1* | 11/2016 | Kawai | G05B 19/4065 |
| 2018/0029186 | A1* | 2/2018 | Röders | B23Q 17/22 |
| 2018/0088554 | A1* | 3/2018 | Suzuki | G05B 19/404 |
| 2018/0133860 | A1* | 5/2018 | Fujita | B23Q 17/22 |
| 2018/0267505 | A1* | 9/2018 | Shinoda | G05B 19/41825 |
| 2018/0284719 | A1* | 10/2018 | Lever | B23Q 17/22 |
| 2018/0307202 | A1* | 10/2018 | Ikai | G06T 1/60 |
| 2019/0369596 | A1* | 12/2019 | Kamiguchi | G05B 19/408 |
| 2020/0159184 | A1* | 5/2020 | Takeuchi | G05B 19/401 |
| 2020/0368835 | A1* | 11/2020 | Huber | G01B 11/24 |

FOREIGN PATENT DOCUMENTS

| | | |
|---|---|---|
| DE | 102014103240 A1 | 10/2015 |
| EP | 2924526 A1 | 9/2015 |

OTHER PUBLICATIONS

European Search Report for corresponding European Application No. 19195711.7, dated Feb. 28, 2020.
Office Action for corresponding German Patent Application No. 10 2018 122 759.0, dated Aug. 12, 2019.

* cited by examiner

METHOD AND APPARATUS FOR WEAR ANALYSIS ON A MACHINE TOOL

CROSS REFERENCE TO RELATED APPLICATIONS

This application claims priority from German patent application 10 2018 122 759.0, filed on Sep. 17, 2018. The entire content of that priority application is fully incorporated by reference herewith.

This disclosure is related to a method of controlling a machine tool with several working axes configured to displace a working head and/or a workpiece. This disclosure also concerns a corresponding device for controlling a machine tool.

BACKGROUND

Workpieces can be machined with high precision using a machine tool. However, it is known that the machining accuracy of a machine tool decreases over time. It is therefore possible to define cycles in which the moving parts of a machine tool are to be exchanged. Alternatively, or in addition to this, it is possible to check whether the workpieces are still being manufactured within the specified tolerances by random sampling of the finished workpieces. If this is no longer the case, the worn components of a machine tool are replaced.

It is an object to provide an improved method and a corresponding device to determine the wear on the machine tool.

According to one aspect, this object is achieved by a method for controlling a machine tool with several working axes configured to move a working head and/or a workpiece, the method comprising the steps of:
 providing a data memory containing, for at least one specific working axis of said plurality of working axes, a plurality of data tuples each assigning a load value to a position value relative to said specific working axis,
 selecting, from the plurality of data tuples, a first data tuple having a first position value and a first load value and a second data tuple having a second position value and a second load value, the first position value being different from the second position value; and
 generating at least one control command for the machine tool, the control command being adapted to perform a first tolerance measurement at a first position described by the first position value and a second tolerance measurement at a second position described by the second position value; and
wherein, based on a first result of the first tolerance measurement and a second result of the second tolerance measurement, information about wear of a part of the machine tool is output.

The inventors recognized that, although it is possible in the state of the art to determine whether a machine tool has left a specified tolerance range, a large number of parts of the machine tool must be replaced in order to restore the desired tolerances. Instead, the inventors looked for a way to assign a determined wear, which for example is indicated by leaving a defined tolerance range, specifically to a group of components or even to exactly one component of the machine tool.

This possibility is provided by the method described above. On the one hand, it makes it possible to identify the type of wear that exists on one or more working axes that are configured to displace the working head and/or the workpiece. On the other hand, it is also possible to narrow down the components that can be considered for the type of wear. For example, a group of components can be identified from all components subject to wear or even a specific component can be identified.

On the one hand, this information can make it possible to identify the cause of wear and to take appropriate countermeasures, such as changing the program that controls the machine tool. On the other hand, it is no longer necessary to replace all parts subject to wear, but only a subgroup of the parts subject to wear or even just one specific component. These findings make it possible to reduce the operating costs of the machine tool or to enable longer operation of the machine tool within the specified tolerance range.

According to the proposed solution, a large number of data tuples are stored in a data memory. The term data tuple is used to describe the relationship between two or more data. Specifically, for at least one specific working axis of the plurality of working axes, the data tuples have a position value, in particular a linear position value or an angular position value relative to the specific working axis, i.e., at a linear position value along the specific working axis and/or at an angular position value about the specific working axis, to which at least one load value contained in the data tuple is assigned.

The load values of the data tuples can either be determined empirically, calculated mathematically, e.g. by simulation or analysis of the control program, or estimated. Of course, the load values can also be determined by considering several aspects. As an example, it should be noted that, as a rule, a position in which a spindle head of the machine tool is frequently located will have a higher load value than a position in which the spindle head is rarely located. As a further example, a position traversed by the spindle head at high speed will often have a higher load value than a position traversed at low speed.

Two data tuples are then selected from this multitude of data tuples, whose corresponding position values are different from each other. For some embodiments, the position values are selected so that the first load value is different from the second load value. In other words, two positions are selected along at least one specific working axis whose load values are different.

In a further step, a control command for the machine tool is generated. This control command causes a first tolerance measurement to be performed at a first position described by the first position value from the first data tuple and a second tolerance measurement to be performed at a second position described by the second position value from the second data tuple. In other words, tolerance measurements are carried out at two positions, whereby in some embodiments the load values corresponding to these positions differ from each other.

For certain embodiments, each of the tolerance measurements determines the range within which a deviation between a specified target position and an actual position is present. The greater the deviation, the greater the tolerance. During production it must therefore be ensured that the measured tolerance range does not exceed the maximum permitted tolerances. The larger the determined tolerance is, the more likely it is to be assumed that a problem is caused by wear.

Based on the results of the tolerance measurements, information on the wear of at least a part of the machine tool is then output. The fact that the tolerance measurements are carried out at two positions which are known to have different load values assigned to them makes it possible to use this information to determine a specific group of components or even exactly one component about which information can be output with regard to wear.

The method can be carried out in the machine tool itself or outside the machine tool. The information that is output may be a predication.

Exemplary embodiments will now be explained in the following.

In an exemplary embodiment, if the first and second results approximately match, information is output that wear has occurred on a first component that is assigned to the specific working axis and can be moved relative to the specific working axis.

It is assumed that, if the results with regard to the tolerances or with regard to the determined wear at two positions of the working axis are at least approximately the same, it is not to be assumed that there is locally pronounced wear along the working axis, but rather wear on a component which can be moved along the specific working axis, such as a working head or a spindle head. For some embodiments, the approximate correspondence between the first and second result is assumed if the difference between the first and second result is less than 15%, less than 10%, less than 5% or less than 3%.

In a further exemplary embodiment, if there is a significant deviation between the first and second result, the information that wear has occurred on a second component that is assigned to the specific working axis and is location-invariant relative to the specific working axis is output.

It is assumed that, if the results differ significantly from each other in terms of tolerances or wear determined at two positions of the working axis, a locally pronounced wear is to be assumed along the working axis, e.g. at a certain position of the spindle. This component can, for example, be the spindle to which the specific working axis is assigned. This position will usually be where the larger tolerance range was measured. For some embodiments, the significant difference between the first and second result is assumed if the difference between the first and second result is greater than 5%, greater than 10%, greater than 15% or greater than 20%.

In a further exemplary embodiment, the first and second data tuples are selected so that the first load value is significantly lower than the second load value.

It is currently assumed that the accuracy of information, especially a predication, regarding the wear on at least part of the machine tool and/or the limitation to a group of components or a specific component can be well carried out if the load values differ significantly from each other. For example, the first and second data tuples can be selected so that the first load value is at least 10%, at least 25%, at least 50% or at least 75% lower than the second load value for different embodiments.

In a further exemplary embodiment, the first and second data tuples are selected such that the first load value is a minimum load value from the plurality of data tuples of the specific working axis and/or the second load value is a maximum load value from the plurality of data tuples of the specific working axis.

In this way, the difference between the first and second load values can be particularly large, which should provide a particularly good indication of the wear of the part of the machine tool.

In a further exemplary embodiment, a first result of the first tolerance measurement is compared with a first earlier result of a third tolerance measurement at a third position coinciding with or close to the first position to obtain a first difference, and a second result of the second tolerance measurement is compared with a second earlier result of a fourth tolerance measurement at a fourth position coinciding with or close to the second position to obtain a second difference.

This embodiment improves the acquisition of information, since values determined earlier can now also be taken into account. This embodiment now allows to recognize a temporal development with regard to the measured tolerances. In order to have a meaningful comparison, the third position for the comparison is chosen so that it matches the first position or is close to the first position. The term "close to" means that the skilled person recognizes a meaningful comparability between the third tolerance measurement at the third position and the first tolerance measurement at the first position, even if the two positions are not identical. In the same way, the fourth position is selected so that it corresponds to the second position or is close to the second position. By evaluating the differences, it can be seen how the tolerance measurement at the first position has changed in relation to the tolerance measurement at the second position.

In a further exemplary embodiment, if the first and second differences approximately match, information is output that wear has occurred on a first component that is assigned to the specific working axis and can be moved along the specific working axis.

The reasoning behind this conclusion is that if there is at least a substantially uniform change at two points of the working axis, it is not to be assumed that there is locally pronounced wear along the working axis, but rather on a component that can be moved along the specific working axis, such as a spindle head. Components that are location-invariant in relation to the specific working axis can then be excluded as the cause of wear or can be considered to be of lesser priority. This can also include the specific working axis itself. For some embodiments, the approximate correspondence of the first and second differences is assumed if the difference between the first and second differences is less than 15%, less than 10%, less than 5% or less than 3%.

In a further exemplary embodiment, if there is a significant deviation between the first and second difference, information is output that wear has occurred on a second component that is assigned to the specific working axis and which is location-invariant with respect to the specific working axis.

The consideration behind this conclusion is that in the case of a significantly different change at two points of the working axis, a locally pronounced wear along the working axis can be assumed, i.e. not on a component that can be moved along the specific working axis, such as a spindle head. Components that shift relative to the specific working axis can then be excluded as the cause of wear or be treated with lesser priority. This may include in particular the working head. For some embodiments, the significant difference between the first and second differences is assumed if the difference between the first and second differences is greater than 5%, greater than 10%, greater than 15%, or greater than 20%.

In a further exemplary embodiment, the maximum difference between the first difference and the second difference is determined and the position value assigned to the maximum difference is output as third information.

On the basis of this information, it is easy to determine where the wear is most advanced in relation to the last tolerance measurement.

In a further exemplary embodiment, the first tolerance measurement and the second tolerance measurement are carried out by means of a circularity test, whereby a circular path used during the circularity test runs through the first position and the second position.

In this embodiment, a known circularity test is positioned in such a way that it runs through the first position on the one hand and through the second position on the other. This allows the circularity test to perform both the first tolerance measurement and the second tolerance measurement in one pass. After completion of the circularity test, there is a tolerance measurement for a position with a lower load value and another tolerance measurement for another position measurement with a higher load value. Since in this case the circularity test only has to be defined with regard to its parameters, the necessary tolerance measurements can be carried out easily.

The object is also achieved by an appropriate device for controlling a machine tool with several working axes, the device comprising
an input interface adapted to receive position data from a data memory,
a processing facility adapted to perform the aforesaid method; and
an output interface configured to output information about the wear of the part of the machine tool.

It goes without saying that the features mentioned above and the features to be explained below can be used not only in the combination indicated, but also in other combinations or in isolation, without leaving the scope and spirit of this disclosure.

BRIEF DESCRIPTION OF THE DRAWINGS

Exemplary embodiments are shown in more detail in the drawing and are explained in more detail in the following description. In the figures.

DETAILED DESCRIPTION OF EXEMPLARY EMBODIMENTS

Figure 1:
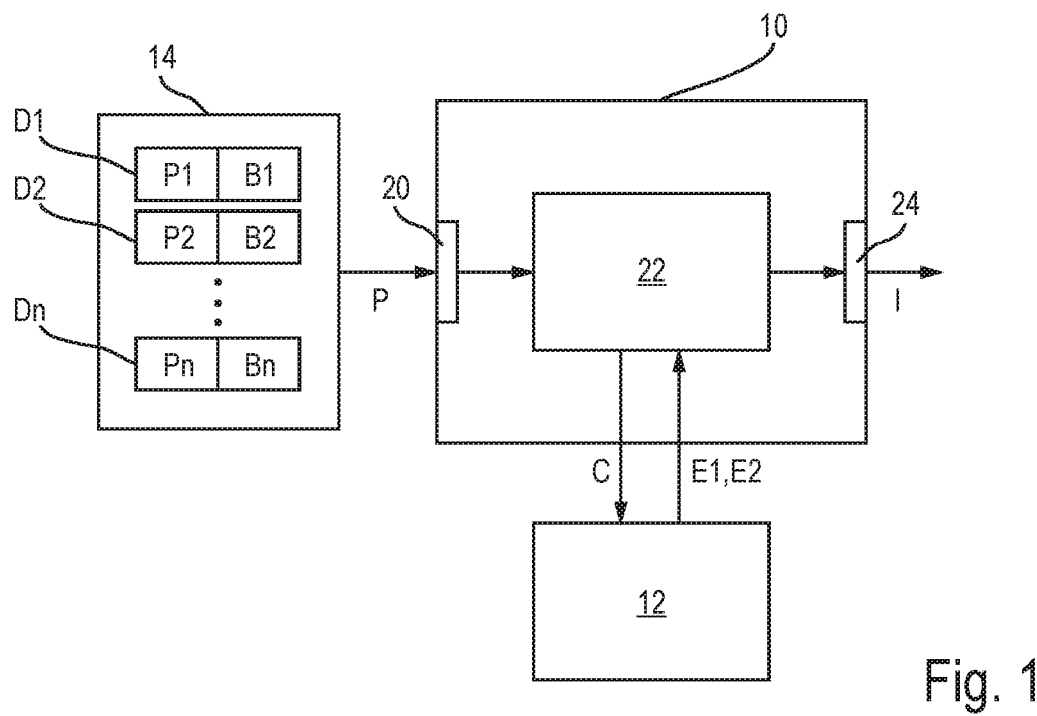
FIG. 1 shows a device for controlling a machine tool.
Figure 2:
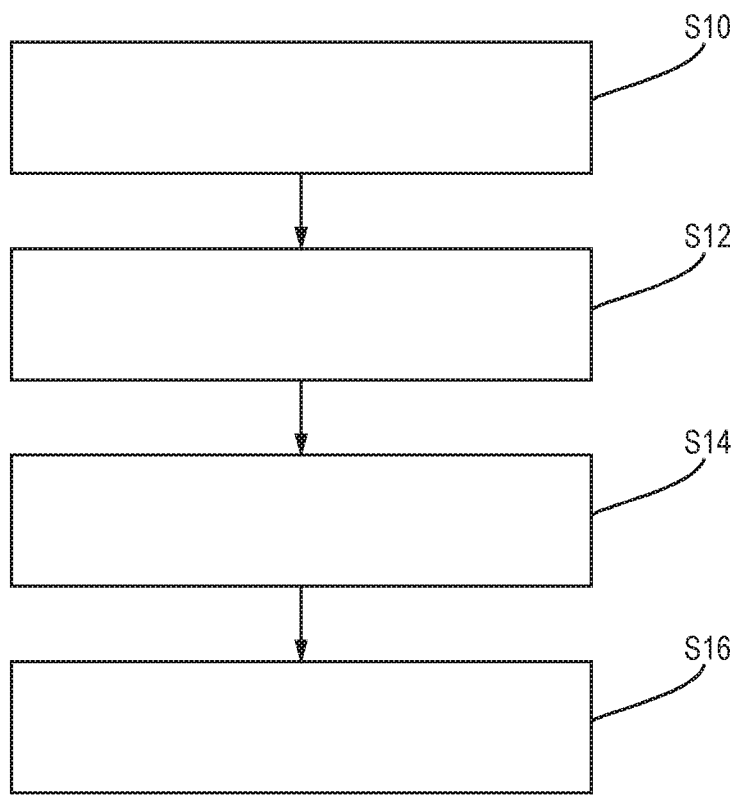
FIG. 2 shows a method for controlling a machine tool.

FIG. 1 shows an exemplary embodiment of a device 10 for controlling a machine tool 12. FIG. 2 shows an exemplary embodiment of a method for controlling the machine tool 12. The method and device 10 are explained in more detail below.

Figure 3:
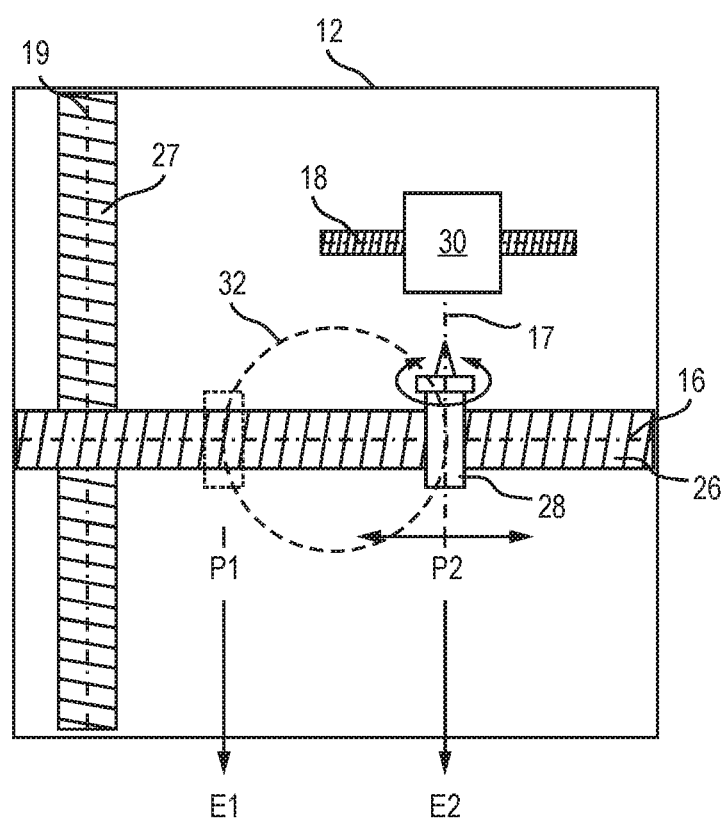
FIG. 3 shows an embodiment of a machine tool.

FIG. 2 shows a data memory 14 which contains a multitude of data tuples $D1, D2, \ldots, Dn$ for at least one specific working axis 16, see FIG. 3, of several working axes 16, 17, 18, 19, see FIG. 3, of the machine tool 12. Each of the data tuples $D1, D2, \ldots, Dn$ assigns a load value $B1, B2, \ldots, Bn$ to a position value $P1, P2, \ldots, Pn$ along the specific working axis 16.

The device 10 has an input interface 20 adapted to receive at least position data P from the data memory 14. The position data P are at least partly the aforementioned position values $P1, P2, \ldots, Pn$. The input interface 20 can receive all position data P from the data memory 14. For certain embodiments, however, only a subset of the position data P is received, in particular, as explained below, two position values $P1, P2$. In some embodiments, the input interface 20 can also receive at least one load value $B1$, several load values $B1, B2, \ldots, Bn$ or all load values $B1, B2, \ldots, Bn$.

The device 10 also has a processing device 22 which is configured to carry out the method described in FIG. 2 below. The apparatus 10 further comprises an output interface 24 adapted to output at least one information I relating to the wear of a part of the machine tool 12.

The method according to FIG. 2 serves to control a machine tool 12 with several working axes 16, 17, 18, 19, which are configured for a displacement of a working head 28 and/or a workpiece 30.

First the data memory 14 is provided, step S10, which contains, for the at least one specific working axis 16 of the plurality of working axes 16, 17, 18, 19, a plurality of data tuples $D1, D2, \ldots, Dn$, which each assign a load value $B1, B2, \ldots, Bn$ to a position value $P1, P2, \ldots, Pn$ along the specific working axis 16.

In a further step S12, a first data tuple D1 comprising a first position value P1 and a first load value B1 and a second data tuple D2 comprising a second position value P2 and a second load value B2 are selected from the plurality of data tuples $D1, D2, \ldots, Dn$, wherein the first load value B1 is different from the second load value B2.

At least one control command C is then generated for the machine tool 12 at step S14, where the control command C is configured to perform a first tolerance measurement at a first position described by the first position value P1 and a second tolerance measurement at a second position described by the second position value P2.

In a further step S16, based on a first result E1 of the first tolerance measurement and a second result E2 of the second tolerance measurement, information I on the wear of a part of the machine tool 12 is output.

FIG. 3 shows an exemplary embodiment of a machine tool 12 in which a workpiece 30 is clamped. The workpiece 30 can be moved along the working axis 18. A working head 28 is also shown, which can be moved using the first spindle 26 as well as the second spindle 27. The first spindle 26 has the specific working axis 16, and the second spindle 27 has a working axis 19. The working head 28 also has a working insert 32, which can be rotated around a working axis 17.

In addition, the first position value P1 and the second position value P2 are symbolically marked, whereby the corresponding tolerance measurements at the corresponding positions lead to the results E1 and E2.

In an embodiment, the first result E1 of the first tolerance measurement is compared with a first earlier result E1 of a third tolerance measurement at a third position coinciding with or close to the first position to obtain a first difference, and the second result E2 of the second tolerance measurement is compared with a second earlier result E1 of a fourth tolerance measurement at a fourth position coinciding with or close to the second position to obtain a second difference.

If there is an approximate match between the first and second differences, information is output in this embodiment indicating that there has been wear on the working head 28 which can be moved along the specific working axis 16. In the case of a significant deviation from the first and second difference, information is output indicating that wear has occurred on the specific working axis 16, which is location-invariant with respect to itself. In other words, the specific working axis 16 does not shift relative to itself.

In the case of an embodiment, the first tolerance measurement and the second tolerance measurement are carried out in such a way that a circularity test is carried out, the circular path of which runs through both the first position P1 and the second position P2, see the symbolic circle indicating the displacement of the working head 28.

Thus, a process and a device 10 were shown which make it possible to indicate, from the totality of components that are subject to wear on a machine tool 12, the wear that has occurred to a subgroup of these components or even to refer to a specific component.

The invention claimed is:

1. A method to control a machine tool having a plurality of working axes which are configured for displacement of at least one of working head and/or a workpiece, the method comprising:
   providing a data memory containing, for at least one specific working axis of the plurality of working axes, a plurality of data tuples which each assign a load value to a position value relative to the specific working axis,
   selecting, from the plurality of data tuples, a first data tuple having a first position value and a first load value and a second data tuple having a second position value and a second load value, the first position value being different from the second position value, and
   generating at least one control command for the machine tool, the control command being adapted to perform a first tolerance measurement at a first position described by the first position value and a second tolerance measurement at a second position described by the second position value,
   wherein on the basis of a first result of the first tolerance measurement and a second result of the second tolerance measurement, information about wear of a part of the machine tool is determined and output.

2. The method according to claim 1, wherein based on an approximate match of first and second results information is output that wear has occurred on a first component which is associated with the specific working axis and which is movable relative to the specific working axis.

3. The method according to claim 1, wherein in case of a significant deviation between first and second results information is output that wear has occurred on a second component which is associated with the specific working axis and which is location-invariant relative to the specific working axis.

4. The method according to claim 1, wherein the first and second data tuples are selected such that the first load value is substantially less than the second load value.

5. The method according to claim 1, wherein the first and second data tuples are selected such at least one of the following conditions is fulfilled: a) the first loading value is a smallest loading value among the plurality of data tuples of the specific working axis, and/or b) the second loading value is a largest loading value among the plurality of data tuples of the specific working axis.

6. The method according to claim 1, wherein the first result of the first tolerance measurement is compared with a first previous result of a third tolerance measurement at a third position coinciding with or close to the first position to obtain a first difference, and the second result of the second tolerance measurement is compared with a second previous result of a fourth tolerance measurement at a fourth position coinciding with or close to the second position to obtain a second difference.

7. The method according to claim 6, wherein an approximate match of first and second differences provides information that wear has occurred on a first component associated with the specific working axis and movable relative to the specific working axis.

8. The method according to claim 7, wherein in case of a significant deviation of first and second difference, the information is output that wear has occurred on a second component which is associated with the specific working axis and is location-invariant relative to the specific working axis.

9. The method according to claim 8, wherein a maximum difference between the first difference and the second difference is determined and the position value assigned to the maximum difference is output as third information.

10. The method according to claim 1, wherein the first tolerance measurement and the second tolerance measurement are performed by a circularity test, wherein a circle described by the circularity test passes through the first position and the second position.

11. A device to control a machine tool with a plurality of working axes, the device comprising:
    a data memory;
    an input interface in communication with and adapted to receive position data from the data memory, the data memory storing, for at least one specific working axis of the plurality of working axes, a plurality of data tuples which each assign a load value to a position value relative to the specific working axis,
    a processor in communication with the input interface that selects, from the plurality of data tuples, a first data tuple having a first position value and a first load value and a second data tuple having a second position value and a second load value, the first position value being different from the second position value, the processing device further generating at least one control command for the machine tool, the control command instructing the machine tool to perform a first tolerance measurement at a first position described by the first position value and a second tolerance measurement at a second position described by the second position value, wherein on the basis of a first result of the first tolerance measurement and a second result of the second tolerance measurement, information about wear of a part of the machine tool is determined and output; and
    an output interface coupled to the processing device that outputs the information about the wear of the part of the machine tool.

12. The device of claim 11, wherein based on an approximate match of first and second results, the processing device outputs information that wear has occurred on a first component which is associated with the specific working axis and which is movable relative to the specific working axis.

13. The device of claim 11, wherein when there is a significant deviation between first and second results, the processing device outputs information that wear has occurred on a second component which is associated with the specific working axis and which is location-invariant relative to the specific working axis.

14. The device of claim 11, wherein the first and second data tuples are selected such that the first load value is substantially less than the second load value.

15. The device of claim 11, wherein the first and second data tuples are selected such at least one of the following conditions is fulfilled: a) the first loading value is a smallest loading value among the plurality of data tuples of the specific working axis, and/or b) the second loading value is a largest loading value among the plurality of data tuples of the specific working axis.

16. The device of claim 11, wherein the first result of the first tolerance measurement is compared by the processing device with a first previous result of a third tolerance measurement at a third position coinciding with or close to the first position to obtain a first difference, and the second result of the second tolerance measurement is compared by the processing device with a second previous result of a fourth tolerance measurement at a fourth position coinciding with or close to the second position to obtain a second difference.

17. The device of claim 16, wherein an approximate match of first and second differences provides information that wear has occurred on a first component associated with the specific working axis and movable relative to the specific working axis.

18. The device of claim 17, wherein when there is a significant deviation of the first and the second difference, the processing device outputs information that wear has occurred on a second component which is associated with the specific working axis and is location-invariant relative to the specific working axis.

19. The device of claim 18, wherein a maximum difference between the first difference and the second difference is determined by the processing device and the position value assigned to the maximum difference is output as third information.

20. The device of claim 11, wherein the first tolerance measurement and the second tolerance measurement are performed by a circularity test, wherein a circle described by the circularity test passes through the first position and the second position.

* * * * *